US00RE44953E

(19) United States
(12) Reissued Patent
Delargy

(10) Patent Number: US RE44,953 E
(45) **Date of Reissued Patent: *Jun. 17, 2014**

(54) ACTIVITY RECORDING MODULE

(71) Applicant: Katrina Delargy, Chester (GB)

(72) Inventor: Katrina Delargy, Chester (GB)

( * ) Notice: This patent is subject to a terminal disclaimer.

(21) Appl. No.: 13/655,909

(22) Filed: Oct. 19, 2012

Related U.S. Patent Documents

Reissue of:

(64) Patent No.: 7,818,143
Issued: Oct. 19, 2010
Appl. No.: 11/866,451
Filed: Oct. 3, 2007

U.S. Applications:

(62) Division of application No. 11/295,869, filed on Dec. 7, 2005, now Pat. No. 7,283,927.

(51) Int. Cl.
*G04F 1/00* (2006.01)

(52) U.S. Cl.
USPC ..... 702/177

(58) Field of Classification Search
USPC ..... 702/177
See application file for complete search history.

(56) References Cited

U.S. PATENT DOCUMENTS

| | | | | |
|---|---|---|---|---|
| 5,659,768 | A | 8/1997 | Forbes et al. | |
| 5,874,965 | A | 2/1999 | Takai et al. | |
| 5,895,451 | A | 4/1999 | Yamade et al. | |
| 5,974,391 | A | 10/1999 | Hongawa | |
| 6,313,852 | B1 | 11/2001 | Ishizaki et al. | |
| 6,324,544 | B1 | 11/2001 | Alam et al. | |
| 6,335,733 | B1 | 1/2002 | Keren et al. | |
| 6,370,566 | B2 | 4/2002 | Discolo et al. | |
| 6,380,953 | B1 | 4/2002 | Mizuno | |
| 7,283,927 | B2 | 10/2007 | Delargy | |
| 8,427,478 | B2 * | 4/2013 | Hao et al. | 345/440 |

* cited by examiner

*Primary Examiner* — Aditya Bhat
(74) *Attorney, Agent, or Firm* — The Marbury Law Group, PLLC

(57) ABSTRACT

The invention refers to a system of recording the activities carried out by an individual person during specific time intervals. This system will normally be on an electronic device, but the initial method of recording may be paper-based. This system involves recording activity and associated attributes as a function of time on a grid, using lines to define the activity recorded in each grid interval. The invention is an intuitive data entry system, principally but not exclusively via touchscreen. The system will preferably be deployed on a handheld digital device with touchscreen entry capability. The activity recording system may also record values, attributes or files associated with specific time intervals. It may generate charts, tables, alerts and reminders. It may synchronize with other devices and applications and may import or export data from them.

36 Claims, 4 Drawing Sheets

ACTIVITY RECORDING MODULE

Matter enclosed in heavy brackets [ ] appears in the original patent but forms no part of this reissue specification; matter printed in italics indicates the additions made by reissue.

CROSS REFERENCE TO RELATED APPLICATIONS

This application is a divisional of U.S. application Ser. No. 11/295,869 filed Dec. 7, 2005, now U.S. Pat. No. 7,283,927. The Ser. No. 11/295,869 application is incorporated by reference herein, in its entirety, for all purposes.

BACKGROUND

This invention relates to a recording system for tracking personal activities during a specified time interval on a specific day.

Modern technology has produced both devices that save time and devices that demand more of our time. The computer has increased productivity by reducing the amount time to create documents, analyze data, and to communicate work product to others via vast networks. The Internet and spread of wireless technologies has made it possible for individuals separated by vast distances to stay "connected." Whatever time savings technology may have conferred have seemingly been lost due to the increased demands that flow from being accessible at any time from anywhere on the planet.

Managing time has thus become an import part of modern life. Time management tools may be designed to keep track of how time has been committed and/or to keep track of how time was actually used. Examples of time-commitment systems include electronic calendars and day planners. Time-spent systems can be viewed as electronic diaries or journals. What these systems have in common is that data is primarily entered in textual form. The data entry process is thus time consuming and the data in free form that is not easily analyzed or represented analytically. This raises the question of whether the data collected using the time management tool has sufficient value to justify the time spent acquiring the collected data.

To the extent that currently available time management tools capture time usage, they do not provide for goal/target setting and performance monitoring and do not server as goal and life planning/management tools.

To manage time effectively, it is important to quantify the time increments spent performing specific tasks. The quantification of time usage facilitates analysis of time usage, the evaluation of particular tasks, and the allocation of resources. Gathering these data cannot, however, become a significant task in its own right.

What would be useful, therefore, is a system for recording details of specific groups of activities in very short intervals, including interruptions or distractions. Additionally, it would be desirable to associate specific groups and categories of activities with files, text, attributes or numerical values. More over, the system for the activity details should be recorded in a form that allows for analysis, decision making, and aggregation of data.

SUMMARY

An embodiment of the present invention is an activity recording module (ARM) operated by an activity recorder.

The activity recorder of this embodiment comprises a display and a user input system for interacting with the ARM. As used in this application, an "activity" relates to a "category" and a "timeframe" having a start and finish time, and a particular category belongs to a group.

In an exemplary embodiment of the present invention, the activity recorder is a personal digital assistant comprising a touchscreen display that performs the functions of the display and the user input system. However, the present invention is not so limited. Other devices may perform the functions of the activity recorder the ARM and other input systems may be used to interact with the ARM without departing from the scope of the present invention. By way of illustration and not as a limitation, the ARM functions may be integrated with or performed by a personal computer (PC), a tablet computer, a notebook computer (laptop), a personal digital assistant (PDA), an electronic organizer, a mobile phone, a smartphone, or a converged device. The user input system may, without limitation, be a keyboard, a keypad, a voice command system, a digital pen, a joystick, a jog dial, a toggle, or a pointing/click device. Further, the ARM may be used as a data capture mechanism whereby the information captured is subsequently loaded onto other applications after storage, or as a portal or gateway to other applications in which case data is captured and transferred to other applications in real time.

In the exemplary embodiment, the ARM uses a grid to record time usage as either categorized or uncategorized. A column of the grid is associated with a group identified by color and a "shortcode" or a mnemonic that appears in a header row at the top of the grid. Categories within the group may be identified by hues of the group colors or other distinguishing colors and a category shortcode. A time interval is unambiguously associated with a single category of activity. In another embodiment of the present invention, the color of the groups and categories is user selectable. In yet another embodiment of the present invention, the colors of the groups and categories is determined by a preset template that may be modified by a user.

The activity recorder is further adapted to calculate various statistical and descriptive factors relating to the proportions of time used to carry out the activities in various time intervals. The time intervals, categories, shortcodes and color codes can be changed by the user as required. Thus any indications of time intervals for recording of activity noted in the figures are not meant as a limitation. The activities may be personal or professional. The time may be recorded during any increment of an hour across the 24 hours of a day. In yet another embodiment of the present invention, targets may be set and alerts triggered. The alerts may signal, for example without limitation, when more than a preset amount of time has been given to a particular category of activity or that some "amount" has been exceeded (e.g. daily allowance of a food, exercise time, costs.)

The invention allows a wide range of different activities to be recorded using color, indicative of a group or a category within a group, and a bar length, indicative of the time spent on the activity. In the exemplary embodiment, a simple touchscreen provides a visual rather than textual or numerical representation of time usage The ARM thus provides a work-life-balance to be monitored and measured that is faster and more readily meaningful than an alphanumeric entry. The ARM is easier for dyslexic or other disadvantaged people to use and is less dependent on any language capability or symbol recognition. The screen of the ARM can be customized based on user-selectable preferences for color, display of icons, priority of task screens and the like.

In yet another embodiment of the present invention, the ARM comprises a plurality of grids that enable a user to record multiple activities. The activities may be related, in which case the group and category information in one grid has a relational connection to a group and category in another grid, or the activities may be unrelated.

In another embodiment of the present invention, a predetermined template is used to obtain data entries specific to a particular purpose. By way of illustration and not as a limitation, a template may be used to obtain information pertinent to a medical condition of a patient, information pertinent to a mental state, observations of a research project, information pertinent to providing disaster relief, and information pertinent to a law enforcement or military action. A template may be "shipped" with the ARM or may be created and imported from a spreadsheet application or via a built in wizard with picklists.

In another embodiment of the present invention, the recorded activity records are manipulated and analyzed, either alone or in conjunction with external data. The manipulation and analysis of the recorded activity records may be performed by the activity recorder on which the ARM is operated or performed by a separate analysis computer to which the recorded activity records have be sent or which accesses the ARM.

In still another embodiment of the present invention, a recorded activity record is automatically transferred to an analysis server when the activity recorder is connected to a network.

In yet another embodiment of the present invention, the activity recorder comprises a wireless network interface and transfers a recorded activity record over the wireless network to the analysis server.

In another embodiment of the present invention, an activity recorder obtains at least some elements of an activity record from another device. By way of illustration and not as a limitation, the other device may be operating an ARM or it may record activity information by other means.

It is an aspect of the present invention to provide an interface for the capture and analysis of data relating to an activities, categories, groups and timeframes as but a few examples of how data may be captured.

It is another aspect of the present invention to accept and present activity data as a dynamic bar graph presented on a grid where the size/spacing of the grid squares may be adjusted to suit user preferences.

It is yet another aspect of the present invention to operate an ARM on a touchscreen device in which the activity data is entered with a stylus or similar device or by direct contact from a user.

It is even another aspect of the present invention to record activities in time increments over a 24 hour period as determined by a template or selected by a user.

It is an aspect of the present invention to permit users to select and change the time windows displayed by the ARM and the time increments in which activity data may be collected.

It is another aspect of the present invention to present activities on the x-axis of a grid associated with columns representing categories, each of which is associated with a main group and a short-code or mnemonic.

It is yet another aspect of the present invention to permit a user of the ARM to select the activities, by group and category, as well as the color and shortcode associated with each category.

It is still another aspect of the present invention to provide templates comprising pre-determined activities, groups, categories, colors and shortcodes.

It is an aspect of the present invention to permit files, numerical values, ranges of values, and formulas to be associated with activities and time intervals.

It is another aspect of the present invention to permit activity data to be imported into an activity recorder and exported from an activity recorder.

It is another aspect of the present invention to aggregate the activity data of multiple ARM users.

It is still another aspect of the present invention to permit a user to select a variety of charts, tables or other analytical or descriptive records relating to the correlation of activities, values or files with time.

It is a further aspect of the present invention to permit notes to be added, emails to be sent and other messages uploaded to preferred programs by a user of the ARM.

It is yet another aspect of the present invention to facilitate the analysis and charting of attributes (e.g. mileage, words-per-minute, heart-rate) versus time or activity so that correlation of stimulus (e.g. eating certain foods, exercise) and response (e.g. productivity, performance measures) may be recorded and presented in various ways.

It is an aspect of the present invention to associate a user note with activity data and to permit the user note to be sent by email or posted to a BLOG.

It is still another aspect of the present invention to allow integration with other collaboration tools such as, but without limitation Wiki, instant messenger, RSS, and MS Sharepoint portal.

In an embodiment of the present invention, an activity recorder comprises a data entry system, a storage system for receiving and storing activity data, and a display system. By way of illustration and not as a limitation, the data entry system may be a touch screen and a stylus for contacting the touch screen, a cursor responsive to a keypad, a cursor responsive to joystick, and a cursor responsive to a mouse. The display system is in communication with the storage system and displays a grid comprising time cells along a first axis and group cells along a second axis. Each time cell has a same first axis coordinate representing a predetermined time segment and each group cell has a same second axis coordinate representing an activity group.

Input is accepted from the data entry system to display a graphical representation of a new time interval associated with an activity group. In an embodiment of the present invention, the activity group comprises activity categories. The new time interval comprises a start time and an end time. In an embodiment of the present invention, the graphical representation of the new time interval associated with the activity group comprises a bar extending from the start time to the end time of the new time interval.

In yet another embodiment of the present invention, the activity group is associated with a group color and the bar is displayed in the group color. In still another embodiment of the present invention, the activity group is associated with a group color and an activity category of that activity group is associated with a hue of the group color.

New activity data comprising the new time interval associated with the activity group is sent to the storage system for storage. In an embodiment of the present invention, the storage system is adapted for importing and exporting stored activity data.

In another embodiment of the present invention, the activity recorder further comprises a rules engine and the storage system comprises the new activity data and stored activity data. The rules engine determines whether the new time interval of the new activity data intersects a stored time interval of the stored activity data comprising a stored start time and a stored end time. The rules engine applies a conflicts rule if new time interval of the new activity data intersects the stored time interval of the stored activity data.

In yet another embodiment of the present invention, the conflict rule comprises the following logic:

- if the start time of new time interval is after the stored start time and if the end time of the new time interval is after the stored end time, then setting the start time of the new time interval to the stored end time;
- if the start time of the new time interval is before the stored start time and if the end time of the new time interval is before the stored end time, setting the stop time of the new time interval to the stored start time;
- if the start time of the new time interval is before the stored start time and if the end time of the new time interval is after the stored end time, the deleting the stored time interval;
- if the start time of the new time interval is after the stored start time and if the end time of the new time interval is before the stored end time, then:
  - setting a first revised stored start time to the stored start time;
  - setting a first revised stored end time to start time of the new time interval;
  - setting a second revised stored start time to the end time of the new time interval; and
  - setting a second revised stored end time to the stored end time.

DETAILED DESCRIPTION

An embodiment of the present invention is an activity recording module (ARM) operated by an activity recorder comprising a display and a user input system for interacting with the ARM. In an exemplary embodiment of the present invention, the activity recorder is a personal digital assistant comprising a touchscreen display that performs the functions of the display and the user input system. However, the present invention is not so limited. Other devices may perform the functions of the ARM and other input systems may be used to interact with the ARM without departing from the scope of the present invention. By way of illustration and not as a limitation, the ARM functions may be integrated with or performed by a personal computer (PC), a tablet computer, a notebook computer (laptop), a personal digital assistant (PDA), an electronic organizer, a mobile phone, a smartphone, or a converged device. The user input system may, without limitation, be a keyboard, a keypad, a voice command system, a joystick, a jog dial, a toggle, a digital pen, or a pointing/click device.

Figure 3:
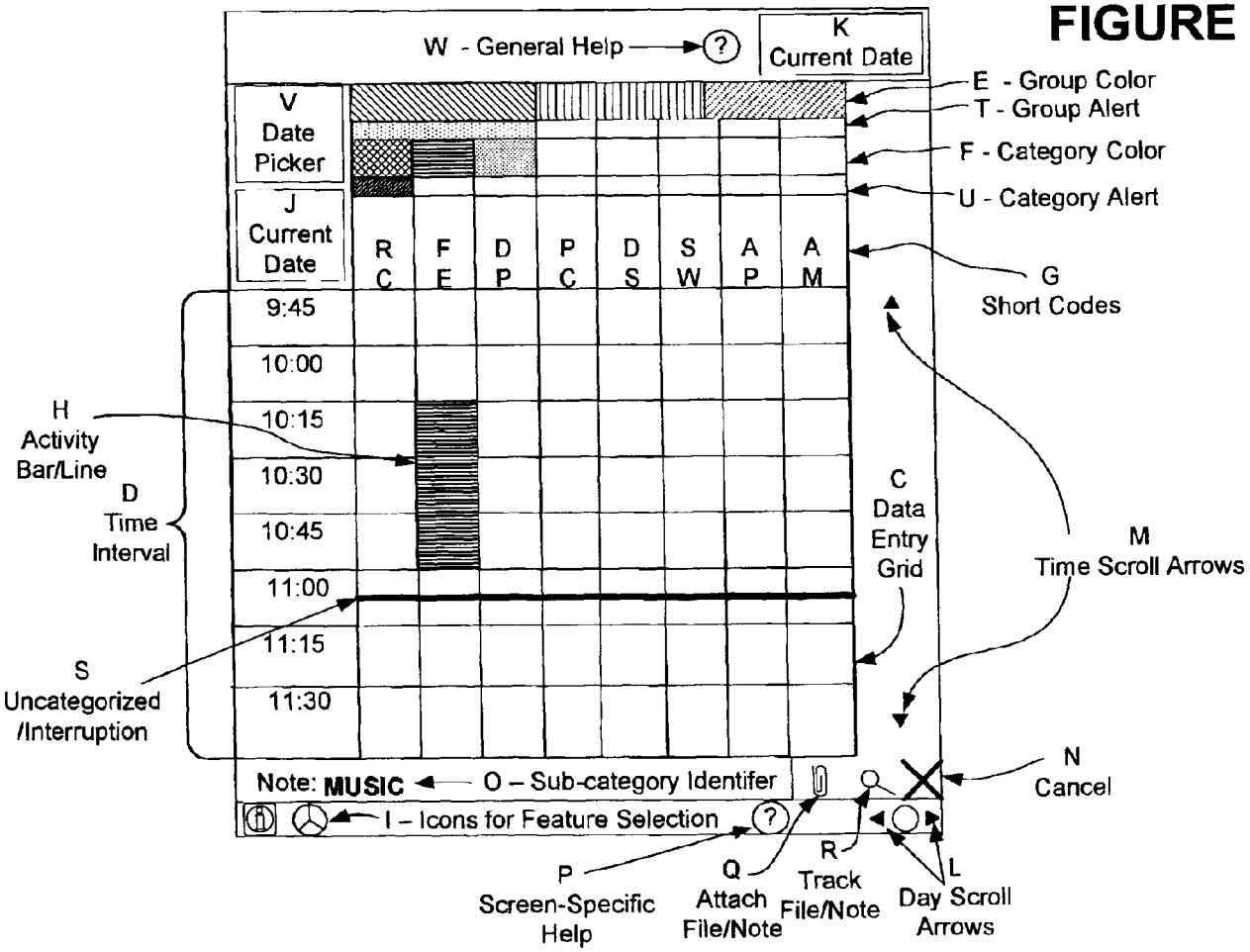
FIG. 3 illustrates a template used by an ARM to create an activity record according to an embodiment of the present invention.

In the exemplary embodiment, the ARM uses a grid to record time usage as either categorized or uncategorized. A column of the grid is associated with a group identified by color and a "shortcode" that appears in a header row at the top of the grid. Categories within the group may be identified by hues of the group colors and a category shortcode. However, this is not meant as a limitation. The category and group colors may be assigned any distinguishing colors as desired by a user. In another embodiment of the present invention, the color of the groups and categories is user selectable. In yet another embodiment of the present invention, the colors of the groups and categories is determined by a preset template that may be modified by a user (see, FIG. 3). A time interval is unambiguously associated with a single category of activity.

The activity recorder is further adapted to calculate various statistical and descriptive factors relating to the proportions of time used to carry out the activities in various time intervals. By way of illustration and not as a limitation, the activity recorder may analyze the activity data for patterns or sequences of events.

The time intervals, categories, shortcodes and color codes can be changed by the user as required. The activities may be personal or professional. The time may be recorded during any increment of an hour across the 24 hours of a day. In yet another embodiment of the present invention, targets may be set and alerts triggered.

Figure 1:
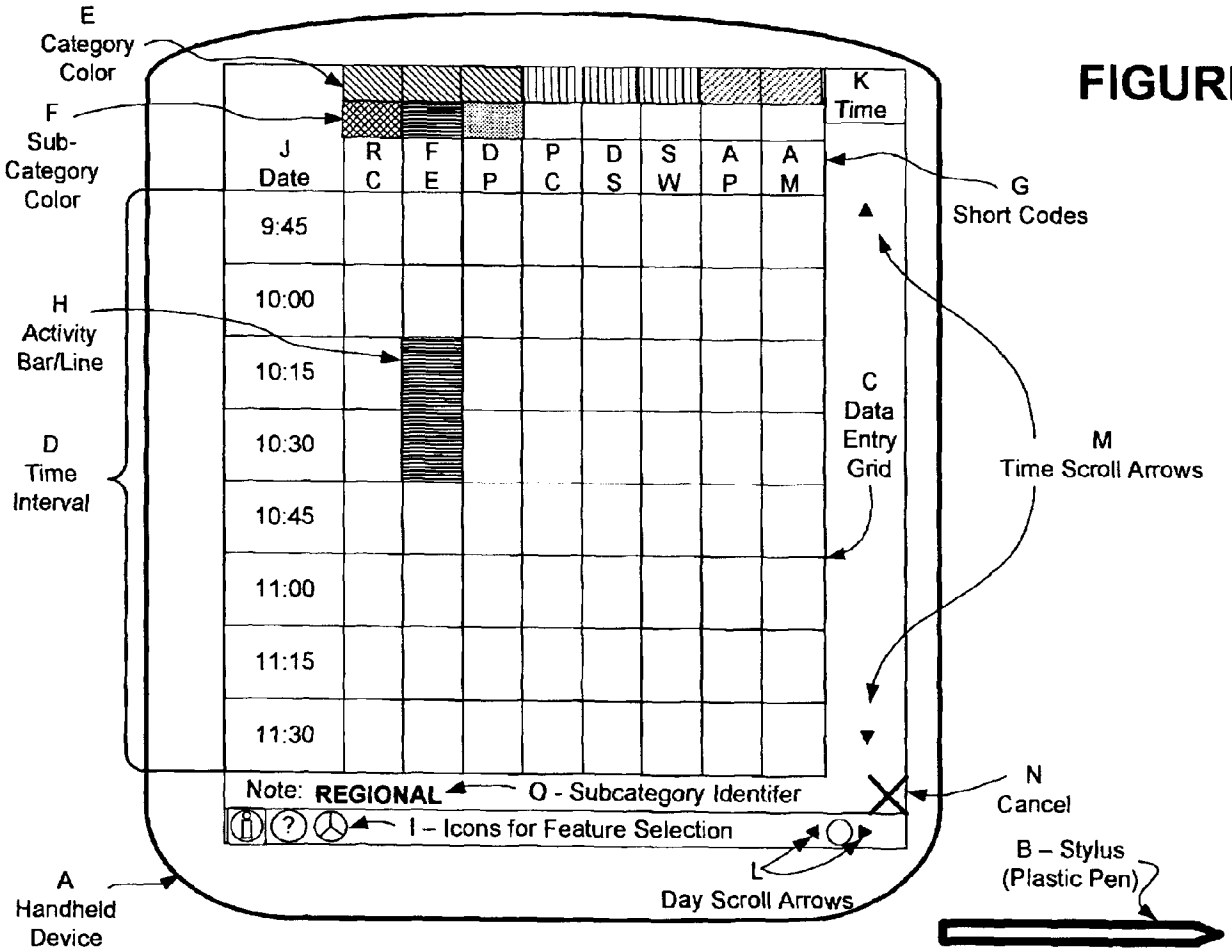
FIG. 1 illustrates an activity recording module (ARM) implemented on an activity recorder according to an embodiment of the present invention.

FIG. 1 illustrates an activity recording module (ARM) implemented on an activity recorder according to an embodiment of the present invention. While FIG. 1 illustrates the ARM implemented on a handheld device, as previously noted, the present invention is not so limited.

Data using a grid (C) with time intervals being displayed on the y-axis (D) and activity groups (E) and categories (F) being displayed above the grid (C) on the x-axis. A group is assigned a color and a category of a group is assigned a hue of the group color. However, this is not meant as a limitation. The category and group colors may be assigned any distinguishing colors as desired by a user. In another embodiment of the present invention, the color of the groups and categories is user selectable. In yet another embodiment of the present invention, the colors of the groups and categories is determined by a preset template that may be modified by a user (see, FIG. 3). A header row of grid (C) comprises a date (I) and a shortcode (G). A current time is indicated in the upper left corner of the display.

Time usage may be indicated by group (e.g. administration) and by category (e.g. filing, accounts, purchasing, correspondence). These groups and categories are normally chosen by a user, with each being assigned a shortcode (G). In another embodiment of the present invention, a predetermined template is used to obtain data entries specific to a particular purpose (see, FIG. 3). By way of illustration and not as a limitation, a template may be used to obtain information pertinent to a medical condition of a patient, information pertinent to a mental state, observations of a research project, information pertinent to providing disaster relief, and information pertinent to a law enforcement or military action. A template may be "shipped" with the ARM or may be created and imported from a spreadsheet application or via a built in wizard with picklists.

As illustrated in FIG. 1, the shortcode is a pair of letters, but the present invention is not so limited. Letters, numbers, and symbols may be combined to identify the groups and categories of the present invention without departing from its scope.

The category (E) associated with each time interval (D) is allocated by drawing a bar/line (H) in the column corresponding to that activity aligned with the corresponding time interval(s) (D).

According to an embodiment of the present invention, if an activity does not correspond to a pre-defined category, the activity is assigned to a group set aside for uncategorized activities. By way of illustration, an uncategorized activity may include an interruption of a planned activity or an unexpected event within or outside a planned activity. Alternatively, a horizontal line may be drawn across the row(s) associated with the time block used for the uncategorized activity. In yet another embodiment of the present invention, a line is drawn across a row of the grid by a tap or doubleclick in the time interval box (D) associated with the uncategorized activity.

In yet another embodiment of the present invention, grid "C" may be larger than the display of the ARM. In this embodiment, the groups that are displayed may represent a consecutive block of grid squares selected by scrolling the horizontally and/or vertically. In still another embodiment of the present invention, the displayed grid is selected from the available rows and columns by the user.

At any time, a grid square or group of squares may be allocated to another activity. The latest allocation takes priority in the database with no time interval being attributed to more than one activity. A process by which this priority override is achieved is illustrated in FIG. 2. It may however be possible to allocate one time interval to both an activity or an attribute or file. Further the ARM may also have more than one activity or user able to access its capabilities with more that one screen being displayed representative of multiple applications.

In yet another embodiment of the present invention, the ARM comprises a plurality of grids that enable a user to record multiple activities. The activities may be related, in which case the group and category information in one grid has a relational connection to a group and category in another grid, or the activities may be unrelated.

In another embodiment of the present invention, groups, categories, shortcodes, colors and other attributes are defined in a library file from which a selection may be displayed and used at any time. In this way, templates for specific activities may be pre-established and call when needed. The display may be enlarged or condensed.

These selections of templates and other data representation modes may be selected via a series of icons (I) or menu lists. In an embodiment of the present invention, the icons that are not used for a particular activity are not displayed. In an alternate embodiment of the present invention, the icons that are displayed are selected by the user. The date (J) and time (K) are displayed. Date and time may be changed in a forward or backward direction, for example via date scroll bar (L) and time scroll bar (M) or via menus or other means. Entries may be deleted via the delete icon (N) or menus or other means. In an embodiment of the present invention, a user may select a day from a calendar. A date on which activity data has been collected is displayed in bold or using other well-known display attributes. Categories are listed when active (O).

Figure 2A:
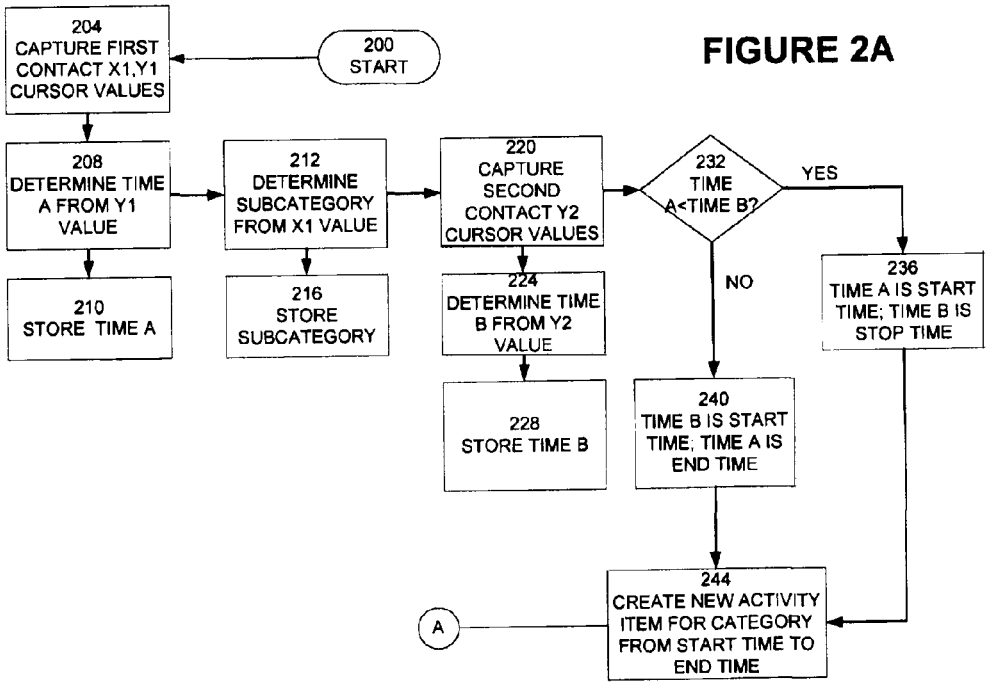
FIGS. 2A and 2B illustrate a process by which an ARM is used to create an activity record according to an embodiment of the present invention.
Figure 2B:
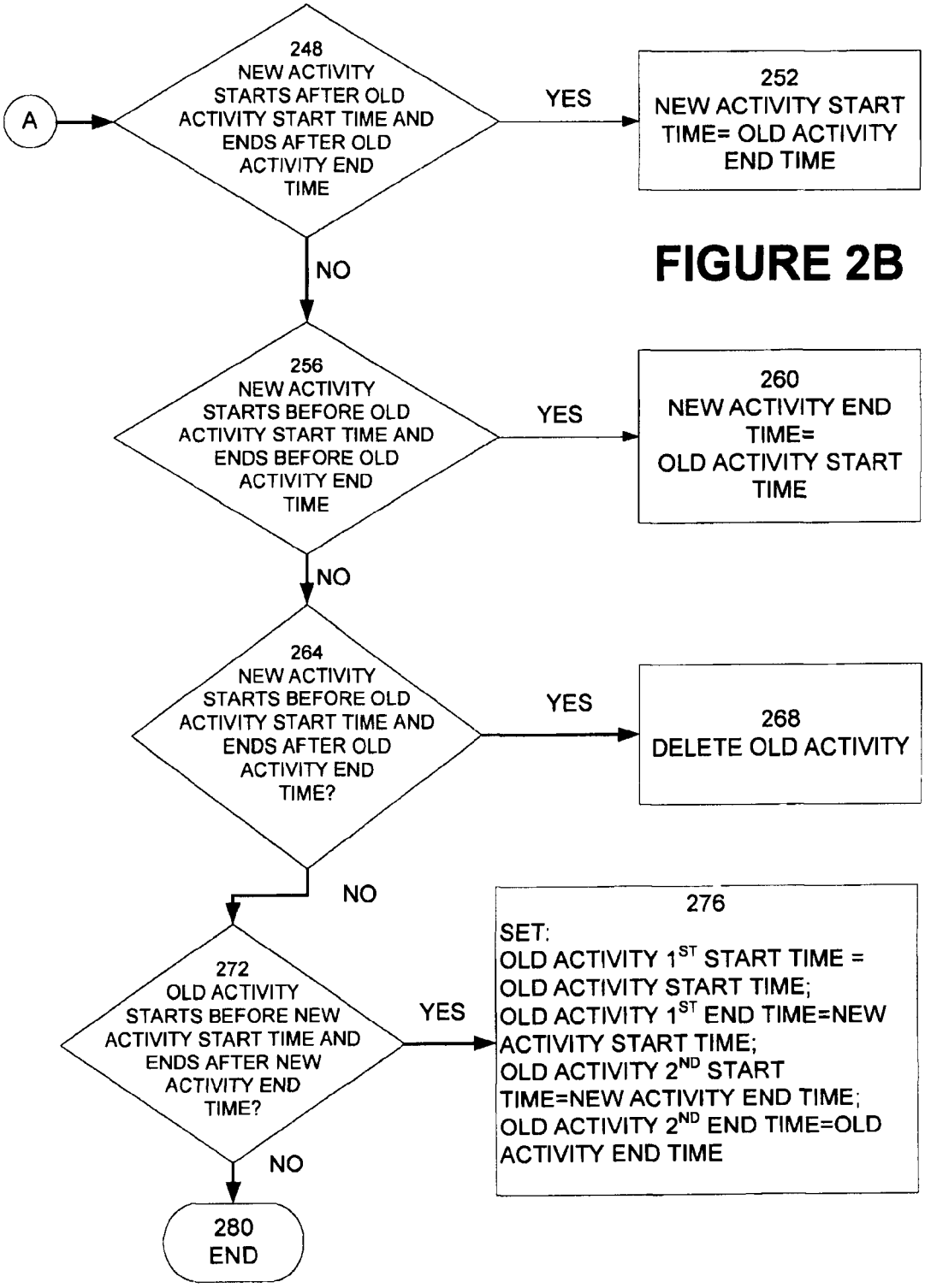

FIGS. 2A and 2B illustrate a process by which an ARM is used to create an activity record according to an embodiment of the present invention. FIG. 2 illustrates this process as performed on an ARM implemented on a handheld device as illustrated in FIG. 1. As previously noted, the process is illustrative only and the present invention is not so limited.

Referring to FIG. 2A, the process begins with the contact of a stylus on a grid displayed on a touchscreen of an activity recorder 200. The cursor coordinates of this first contact point (X1, Y1) are captured 204. Time A is determined from the value of Y1 208. Time A is stored 210. The category of the entry is determined from the value of X1 212. The category is stored.

At some subsequent time, the stylus is positioned on the touchscreen at a point having coordinates X1 and Y2 and the cursor values are captured 220. A time B is determined from the value of Y2 224. Time B is saved 228.

A determination is made as whether time A is less than time B 232. If time A is less than time B, time A is deemed the start time and time B is deemed the stop time 236. If time A is not less than time B, time B is deemed to be the start time and time A is deemed to be the end time 240. A new activity item for the group is created for the start time to the end time 244. In this way, the duration of the new activity is defined by the start and finish time, irrespective of which direction the stylus had moved on the touch screen.

Referring to FIG. 2B, the new activity item is compared to previously stored activity items (herein, an "old" activity item) to resolve conflicts in the recording of time entries. A determination is made whether the new activity starts after the old activity start time and ends after the old activity end time 248. If the new activity starts after the old activity start time and ends after the old activity end time, the new activity start time is set to the old activity end time 252. It should be noted that it is not a requirement that a user fill every time interval. Intervals may be left blank as the situation dictates.

If the new activity does not start after the old activity start time and end after the old activity end time, a determination is made whether the new activity starts before the old activity start time and ends before the old activity end time 256. If the new activity starts before the old activity start time and ends before the old activity end time, the new activity end time is set to the old activity start time 260. However, as noted above, there may be times when not activity is present. In these instances, a time entry is not required If the new activity does not start before the old activity start time and end before the old activity end time, a determination is made whether the new activity starts before the old activity start time and ends after the old activity end time 264. If the new activity starts before the old activity start time and ends after the old activity end time, the old activity is deleted 268.

If the new activity does not start before the old activity start time and end before the old activity end time, a determination is made whether the old activity starts before the new activity start time and ends after the new activity end time 272. If the old activity starts before the new activity start time and ends after the new activity end time, the old activity is divided into two activities as follows 276:

- an old activity first start time is set to the old activity original start time;
- an old activity first end time is set to the new activity start time;
- an old activity second start time is set to the new activity end time; and
- an old activity second end time is set to the old activity original end time.

In an embodiment of the present invention, a new activity is checked against old activities each time an activity is defined in order to assure that the latest entries take priority.

If the old activity does not start before the new activity start time and end after the new activity end time, the process ends 280.

In an embodiment of the present invention, the ARM made be minimized or enlarged to allow other use of the activity recorder while preserving rapid access to the ARM.

In another embodiment of the present invention, attachments are indicated with a paperclip icon and associated with a particular activity and/or time interval. This allows a user to annotate an activity record with images, video, website addresses, documents, comments, music or other sound recordings, and other types of files. This provides an enhanced e-diary capability which may be archived and restored or represented in different ways.

The activity record data may be analyzed and charted in many ways. By way of illustration and not as a limitation, these data may be used to create a table, a statistical analysis, a bar chart, a pie chart, a spider diagram, or a graph, among others. The data may be analyzed in specific time ranges and/or activity groups, for example "Monday to Friday from 9 am to 5 pm" or alternatively "weekends only", or many other combinations.

In an embodiment of the present invention, alerts and reminders may be set according to their choice of criteria. By way of illustration and not as a limitation, an alarm may sound to indicate when a certain amount of time has been spent on a specific activity or when a certain percent of that time has been used. Alternatively, a visual but non-intrusive alert may be established to indicate when they are close to using a target amount of time on a chosen activity. The alerts may signal, for example without limitation, when more than a preset amount of time has been given to a particular category of activity or that some "amount" has been exceeded (e.g. daily allowance of a food, exercise time, costs). Such alerts may also refer to ratios of time on different activities, for example work versus entertainment, caring versus chores, or one project versus another.

In yet another embodiment of the present invention, data is be imported from other applications or exported to other applications to auto populate certain fields. Such data may be analyzed and charted in many ways, for example to compare planned/scheduled versus actual use of time.

In one embodiment of the present invention, the data acquisition aspect of the system is separated from the data analysis and charting process with data capture being on a activity recording (ideally "always on" and "always with you" with a small screen and relying to some extent on battery power) and data analysis and presentation being on a larger and less mobile device (not always on or "with you", generally powered by an external source, larger screen and more readily connected to printers etc).

In yet another embodiment of the present invention, the activity recorder is connected to other data capture devices such as health monitors (e.g. for diabetes, glucose level measurement, multiple sclerosis), sports training monitors, exercised monitors, medication monitors, and others to automatically capture readings of specific time-dependent parameters. This may include measures of stress or other responses to external stimuli. The data may be organized using a template as previously described.

In another embodiment of the present invention, the activity recorder is connected to contact management systems, task lists, cost accounting systems (such as activity based costing) or other electronic diary/organizer facilities. In this embodiment of the present invention, the activity recorder may be further adapted to provide charts that visually represent a wide range of activities, such as pattern and frequency of contacting certain individuals by telephone or other means.

In even another embodiment of the present invention, the ARM is location sensitive such that the activity data further comprises location data (i.e. an integrated Global Positioning System). By way of illustration and not as a limitation, the location data may be used to determine the time of travel between two locations or to associate an activity with a location. An activity that does not match the location identified by the location data would prompt an alert to be issued.

In still another embodiment of the present invention, the ARM is used by consultants, coaches and other intermediaries to support and guide users on how their time is used and how that affects their goals. It may therefore be operated in combination with a phone or with website communities or collaboration tools to provide question and answer, tips or other exchange of views.

In an embodiment of the present invention, data may be imported from a application. By way of illustration and not as a limitation, imported data may comprise a appointment data or a task. Imported data may also comprise data of past activities or template data for a current activity. Activity data may also be exported to applications via wired or wireless network connections or direct connection to the ARM.

In another embodiment, the ARM can be used in a monitoring and analysis mode. In this case, information that has been stored in the ASRM can be analyzed to determine how time was used and on what tasks. In a similar fashion, the ARM can be sued to analyze what resources and tasks are to be engaged in (i.e. forward-looking) so that resources can be appropriately allocated and conflicts found. In this mode, goal setting and performance monitoring can be achieved by analyzing the tasks noted and obtaining feedback on the execution of those tasks.

Using the ARM in conjunction with other activities would potentially allow a user to note dietary, medical, sports and other information in conjunction with the noted time entries thus allowing analysis of other factors along with the time entries themselves.

It will be apparent to those skilled in the art that the ARM may also comprise other feature now becoming available on other wireless devices such as email, web surfing, physical navigation and other tasks.

An activity recorder has been described. It will be understood by those skilled in the art that the present invention may be embodied in other specific forms without departing from the scope of the invention disclosed and that the examples and embodiments described herein are in all respects illustrative and not restrictive. Those skilled in the art of the present invention will recognize that other embodiments using the concepts described herein are also possible. Further, any reference to claim elements in the singular, for example, using the articles "a," "an," or "the" is not to be construed as limiting the element to the singular. Moreover, a reference to a specific time, time interval, and instantiation of scripts or code segments is in all respects illustrative and not limiting.

What is claimed is:

1. An activity recorder comprising:

a data entry system;

a storage system for receiving and storing activity data; and a display system, wherein the display system is in communication with the storage system and wherein the display system is configured for:

displaying a grid comprising:

time cells along a first axis, wherein each time cell has a same first axis coordinate representing a predetermined time segment; and group cells along a second axis, wherein each group cell has a same second axis coordinate representing an activity group;

accepting input from the data entry system to display a graphical representation of a new time interval associated with [an] *the* activity group, wherein the new time interval comprises a start time and an end time;

sending new activity data to the storage system for storage, where the new activity data comprises the new time interval associated with the activity group; and signaling an alert when aggregated time intervals associated with [an] *the* activity group exceed a preset amount;

a rules engine, wherein the storage system comprises the new activity data and stored activity data and wherein the rules engine comprises instructions for:

determining whether the new time interval of the new activity data intersects a stored time interval of the stored activity data, wherein the stored time interval comprises a stored start time and a stored end time; [and]

applying a conflicts rule if new time interval of the new activity data intersects the stored time interval of the stored activity data;

if the start time of new time interval is after the stored start time and if the end time of the new time interval is after the stored end time, then setting the start time of the new time interval to the stored end time;

if the start time of the new time interval is before the stored start time and if the end time of the new time interval is before the stored end time, setting the stop time of the new time interval to the stored start time;

if the start time of the new time interval is before the stored start time and if the end time of the new time interval is after the stored end time, the deleting the stored time interval; and if the start time of the new time interval is after the stored start time and if the end time of the new time interval is before the stored end time, then:

setting a first revised stored start time to the stored start time;

setting a first revised stored end time to start time of the new time interval;

setting a second revised stored start time to the end time of the new time interval;

and setting a second revised stored end time to the stored end time.

2. The activity recorder of claim 1, wherein each group cell is associated with a short code.

3. The activity recorder of claim 1, wherein a predetermined template is used to obtain data entries specific to a medical condition [of a patient] *associated with a user*.

4. The activity recorder of claim 1, wherein a predetermined template is used to obtain data entries specific to providing disaster relief.

5. The activity recorder of claim 1, wherein a predetermined template is used to obtain data entries specific to law enforcement or military action.

6. The activity recorder of claim 1, wherein the data entry system is selected from the group consisting of a touch screen and a stylus for contacting the touch screen, a cursor responsive to a keypad, a cursor responsive to joystick, and a cursor responsive to a mouse.

7. The activity recorder of claim 1, wherein the graphical representation of the new time interval associated with the activity group comprises a bar extending from the start time to the end time of the new time interval.

8. The activity recorder of claim 7, wherein the activity group is associated with a group color and wherein the bar is displayed in the group color.

9. The activity recorder of claim 1, wherein the activity group comprises activity categories.

10. The activity recorder of claim 9, wherein the activity group is associated with a group color and wherein an activity category of that activity group is associated with a hue of the group color.

11. The activity recorder of claim 1, wherein the storage system is configured for exporting stored activity data.

12. The activity recorder of claim 1, wherein the storage system is configured for importing other stored activity data.

*13. The activity recorder of claim 1, wherein a template created in a separate application is imported and used to obtain data entries.*

*14. The activity recorder of claim 1, wherein at least part of the activity recorder functions are integrated with a computing device selected from the group consisting of a personal computer, a tablet computer, a notebook computer, a personal digital assistant, an electronic organizer, a mobile phone, a smartphone, and a converged device.*

*15. The activity recorder of claim 14, wherein the computing device includes a keyboard.*

*16. The activity recorder of claim 1, wherein the data entry system is selected from the group consisting of a touchscreen, a stylus, a keyboard, a keypad, a voice command system, a digital pen, a joystick, a jog dial, a toggle, a pointing/clicking device, a health monitor, a sports training monitor, an exercise monitor, and a medication monitor.*

*17. The activity recorder of claim 16, wherein input from the data entry system comprises a measurement selected from the group consisting of blood pressure, blood glucose level, heart rate, and body temperature.*

*18. The activity recorder of claim 16, wherein input from the data entry system comprises data from a sensor selected from the group consisting of a pedometer, a GPS receiver, and an accelerometer.*

*19. The activity recorder of claim 1, wherein the graphical representation of the new time interval associated with the activity group comprises an icon.*

*20. The activity recorder of claim 1, wherein each time cell has a shape selected from the group consisting of a square shape, a rectangular shape, a square-rectangular shape in a vertical orientation, and a square-rectangular shape in a horizontal orientation.*

*21. The activity recorder of claim 1, wherein the aggregated time intervals associated with an activity group comprises the time intervals associated with one or more category of the activity group.*

*22. The activity recorder of claim 1, wherein the alert is selected from the group consisting of an audible alert and a visual alert.*

*23. The activity recorder of claim 1, wherein signaling an alert when aggregated time intervals associated with an activity group exceed a preset amount comprises:*

*signaling an alert when a ratio of the aggregated time intervals associated with the activity group to aggregated time intervals associated with a different activity group exceeds the preset amount.*

*24. The activity recorder of claim 1, wherein displaying a grid comprises displaying a plurality of grids that enable a user to record multiple activities.*

*25. The activity recorder of claim 1, wherein the stop time of the new interval is on a different date than the start time of the new interval.*

*26. The activity recording module of claim 1, further comprising aggregating activity data of multiple ARM users.*

*27. The activity recording module of claim 1, further comprising annotating the new activity data, wherein an annotation is selected from the group consisting of a note, an email, a message, an image, a music recording, and a video.*

*28. The activity recording module of claim 1, wherein the activity recording module is operated in combination with a collaboration tool selected from the group consisting of a phone, a website community, an instant messenger, a RSS feed, and a MS Sharepoint portal.*

*29. The activity recorder of claim 1, wherein a template is used populate data entries specific to a user's routine.*

*30. The activity recorder of claim 1, wherein signaling an alert when aggregated time intervals associated with the activity group differs from a preset amount comprises signaling an alert when aggregated time intervals associated with the activity group exceeds the preset amount.*

*31. The activity recorder of claim 1, wherein signaling an alert when aggregated time intervals associated with the activity group differs from a preset amount comprises signaling an alert when aggregated time intervals associated with the activity group is less than the preset amount.*

*32. The activity recorder of claim 1, wherein the activity is selected from the group consisting of obtaining information pertinent to a medical condition, obtaining information pertinent to a mental state, obtaining observations of a research project, obtaining information pertinent to providing disaster relief, and obtaining information pertinent to a law enforcement or military action.*

*33. An activity recorder comprising:*

*a data entry system;*

*a storage system for receiving and storing activity data; and*

*a display system, wherein the display system is in communication with the storage system and wherein the display system is configured for:*

*displaying a grid comprising:*

*time cells along a first axis, wherein each time cell has a same first axis coordinate representing a predetermined time segment; and*

*group cells along a second axis, wherein each group cell has a same second axis coordinate representing an activity group;*

*accepting input from the data entry system to display a graphical representation of a new time interval associated with the activity group, wherein the new time interval comprises a start time and an end time;*

*sending new activity data to the storage system for storage, where the new activity data comprises the new time interval associated with the activity group; and*

*signaling an alert when aggregated time intervals associated with the activity group differ from a preset amount;*

*a rules engine, wherein the storage system comprises the new activity data and stored activity data and wherein the rules engine comprises instructions for:*

*determining whether the new time interval of the new activity data intersects a stored time interval of the stored activity data, wherein the stored time interval comprises a stored start time and a stored end time;*

*applying a conflicts rule if new time interval of the new activity data intersects the stored time interval of the stored activity data;*

*if the start time of new time interval is after the stored start time and if the end time of the new time interval is after the stored end time, then setting the start time of the new time interval to the stored end time;*

*if the start time of the new time interval is before the stored start time and if the end time of the new time interval is before the stored end time, setting the stop time of the new time interval to the stored start time;*

*if the start time of the new time interval is before the stored start time and if the end time of the new time interval is after the stored end time, the deleting the stored time interval; and*

*if the start time of the new time interval is after the stored start time and if the end time of the new time interval is before the stored end time, then:*

*setting a first revised stored start time to the stored start time;*

*setting a first revised stored end time to start time of the new time interval;*

*setting a second revised stored start time to the end time of the new time interval; and*

*setting a second revised stored end time to the stored end time.*

*34. The activity recorder of claim 33, wherein the activity is selected from the group consisting of obtaining information pertinent to a medical condition, obtaining information pertinent to a mental state, obtaining observations of a research project, obtaining information pertinent to providing disaster relief, and obtaining information pertinent to a law enforcement or military action.*

*35. An activity recorder comprising:*

*a data entry system, wherein the data entry system is selected from the group consisting of a touchscreen, a stylus, a keyboard, a keypad, a voice command system, a digital pen, a joystick, a jog dial, a toggle, a pointing/clicking device, a health monitor, a sports training monitor, an exercise monitor, and a medication monitor;*

*a storage system for receiving and storing activity data; and*

*a display system, wherein the display system is in communication with the storage system and wherein the display system is configured for:*

*displaying a grid comprising:*

*time cells along a first axis, wherein each time cell has a same first axis coordinate representing a predetermined time segment; and*

*group cells along a second axis, wherein each group cell has a same second axis coordinate representing an activity group;*

*accepting input from the data entry system to display a graphical representation of a new time interval associated with the activity group, wherein the new time interval comprises a start time and an end time; and*

*sending new activity data to the storage system for storage, where the new activity data comprises the new time interval associated with the activity group, wherein each group cell is associated with a short code;*

*a rules engine, wherein the storage system comprises the new activity data and stored activity data and wherein the rules engine comprises instructions for:*

*determining whether the new time interval of the new activity data intersects a stored time interval of the stored activity data, wherein the stored time interval comprises a stored start time and a stored end time;*

*applying a conflicts rule if new time interval of the new activity data intersects the stored time interval of the stored activity data;*

*if the start time of new time interval is after the stored start time and if the end time of the new time interval is after the stored end time, then setting the start time of the new time interval to the stored end time;*

*if the start time of the new time interval is before the stored start time and if the end time of the new time interval is before the stored end time, setting the stop time of the new time interval to the stored start time;*

*if the start time of the new time interval is before the stored start time and if the end time of the new time interval is after the stored end time, then deleting the stored time interval; and*

*if the start time of the new time interval is after the stored start time and if the end time of the new time interval is before the stored end time, then:*

*setting a first revised stored start time to the stored start time;*

*setting a first revised stored end time to start time of the new time interval;*

*setting a second revised stored start time to the end time of the new time interval; and*

*setting a second revised stored end time to the stored end time.*

*36. The activity recorder of claim 35, wherein the activity is selected from the group consisting of obtaining information pertinent to a medical condition, obtaining information pertinent to a mental state, obtaining observations of a research project, obtaining information pertinent to providing disaster relief, and obtaining information pertinent to a law enforcement or military action.*

* * * * *